United States Patent Office 3,836,460
Patented Sept. 17, 1974

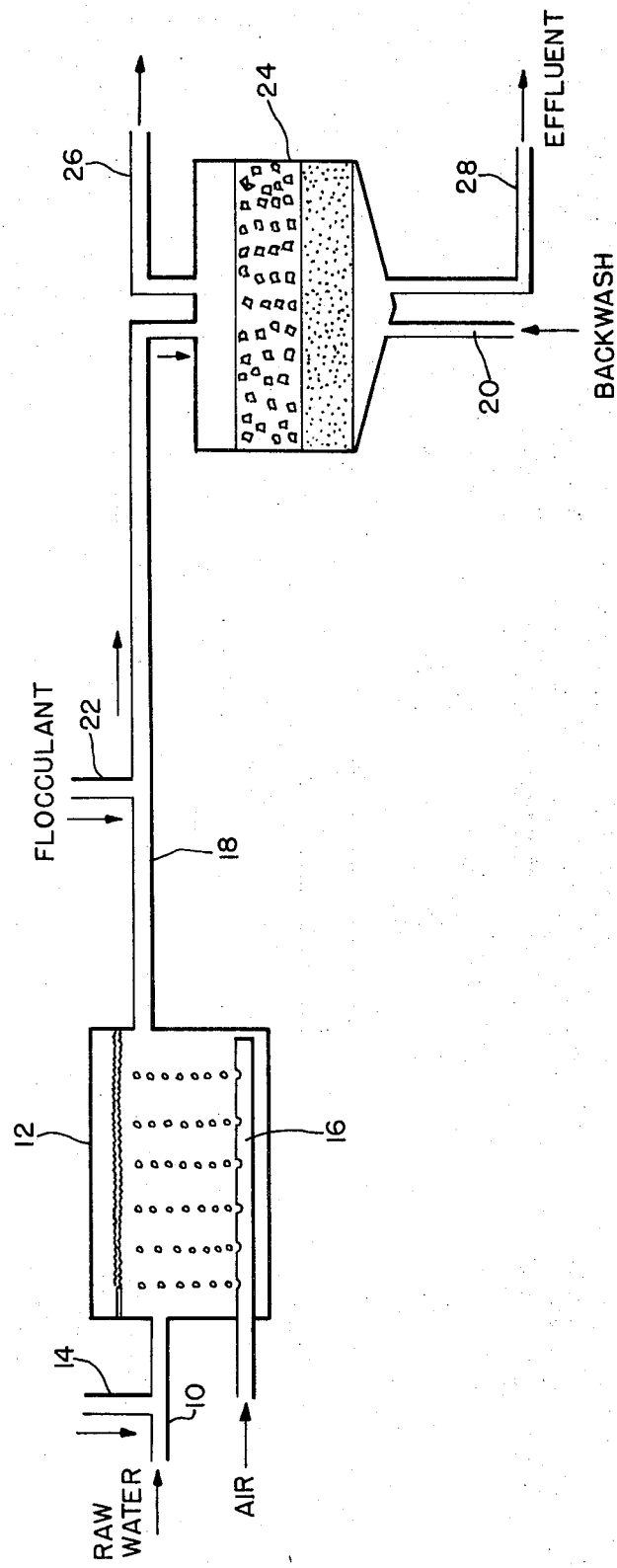

3,836,460
PROCESS FOR REMOVAL OF ALGAE, DIATOMS AND ORGANIC CONTAMINANTS FROM WATER
Roderick M. Willis, 2624 W. Crockett 98199, and Charles L. Oldfather, 8812 40th Ave. SW. 98116, both of Seattle, Wash.
Filed Mar. 27, 1972, Ser. No. 238,119
Int. Cl. B01d 21/01; C02b 1/20
U.S. Cl. 210—44      3 Claims

ABSTRACT OF THE DISCLOSURE

The bulk of algae, diatoms and other organic contaminants is effectively removed from river waters and other surface water preliminary to or concurrently with conventional flocculation processes by contacting the raw water with an amount of an organic cationic polyelectrolyte at a polymer dosage beyond the range where a visible floc is formed, generally 15 to 50 parts per million. The coalesced material is removed from the effluent by sparging finely dispersed air through the treated water to float the material. The floating material is removed by skimming or other suitable means. The treated effluent is then either flocculated by a conventional process or run directly through an inverted bed filter for filtering the same.

BACKGROUND OF THE INVENTION

1. Field of the Invention

This invention relates to the treatment of potable water wherein water from a natural source such as a lake, river or other body is treated to remove contaminants therefrom.

2. Prior Art Relating to the Disclosure

Most municipal water treatment plants employ an overall treating process which characteristically includes coagulation or flocculation, sedimentation and filtration for removal of turbidity, color, bacteria, viruses, algae and organic debris. Flocculation or coagulation of water to free the water of turbidity has generally been accomplished by the use of alum or more recently cationic, anionic or nonionic polyelectrolytes alone or in conjunction with alum. The removal efficiency of polyelectrolytes occurs generally over a limited polymer dosage range. Polymer dosages below this range are not sufficient to flocculate the contaminants and objectionable substances in the water and, above the limited range, result in negligible flocculation. For example, two parts per million of a cationic polyelectrolyte added to a particular water stream caused a heavy floc while, at a concentration of four to five parts per million, a floc did not form. It has been generally recognized that the optimum polymer dosage for flocculating with organic polyelectrolytes is within the range when a visible floc is precipitated as indicated by the well-known jar test.

By earlier processes flocculated water was required to pass through settling basins of a size to provide a residence time of from 1 to 4 hours. Progress has been made in eliminating or drastically reducing the size of these settling basins by development of the inverted bed filter or inverted flow filter with flocculation taking place and the floc removed during flow through the filter. Waterflow during the normal filtration cycle of an inverted bed filter involves passage through at least a portion of the filter media in such a manner that it encounters large grained particles before it encounters smaller grained particles. The purpose of the inverted bed flow is to provide storage capacity of floc in depth through a good portion of the filter bed while retaining a finer section of the bed as a barrier against passage of floc particles penetrating the coarser section. A typical filter, for example, is the dual media bed filter in which the flow is downward through an upper layer of relatively coarse-graded anthracite coal particles and a lower layer of finer sand particles. The dual densities of the filter media are designed to prevent the inverted bed from re-inverting during and after backwash as would occur if all particles were of the same density. By use of these inverted filters many waters are now successfully filtered to high quality standards with acceptable filter efficiencies without the use of any pre-treatment such as the large settling basins referred to earlier.

The tremendous advance in the field of water treatment brought about by the introduction of the inverted bed filter has been hampered by the fact that many natural waters are laden with algae, diatoms and organic matter at certain periods during the year. These contaminants tend to clog or blind the filter bed so rapidly that a practical length of filter run becomes difficult. To solve this problem pretreatment with large settling basins in which the above contaminants are settled from the filter influent has been tried. Thus, even though the inverted bed filters were developed to eliminate the need of settling basins the presence of waters laden with algae, diatoms and organic matter requires the same settling basins even if only used for a brief period out of the year.

SUMMARY OF THE INVENTION

This invention comprises the coalescing and separating of algae, diatoms and other organic contaminants from waters containing the same by contacting raw water with an organic cationic polyelectrolyte at a polymer dosage in excess of that required for visible floc formation as determined by the jar test, and separating the coalesced material from the influent. Separation is preferably effected by injecting air in finely dispersed form into the treated water sufficient to float the coalesced material and removing the floating material by skimming or other operation.

The primary object of this invention is thus to provide a process for coalescing and removing the bulk of algae, diatoms and organic matter in water in conjunction with inverted bed filter systems to render the overall system effective and economical.

BRIEF DESCRIPTION OF THE DRAWING

The drawing illustrates a typical flow diagram and manner of carrying out the invention described herein.

DETAILED DESCRIPTION OF THE INVENTION

The bulk of algae, diatoms and organic matter is removed and separated from raw water by addition of an organic, cationic polyelectrolyte in excess of the range of visible floc formation. The coalesced algae and other material is preferably separated from the treated water by sparging air through the treated water held in a treating vessel to float the material with removal thereof by skimming, maintaining a slight overflow over a weir at the discharge end of the treating vessel, or other suitable means.

Cationic polyelectrolytes which may be employed include those sold under the tradenames Nalcolyte 60 T by Nalco Chemical Company, Magnifloc 521–C by American Cyanamid Company, and Cat–Floc by the Calgon Coroporation. Cat–Floc, for example, is a high molecular weight linear homopolymer of diallyldimethylammonium chloride having a molecular weight ranging from 70,000 to 100,000, generally around 100,000.

Referring to the flow diagram raw water containing algae, diatoms and/or organic contaminants is pumped through line 10 to an air separator tank 12. An organic polyelectrolyte of the type described previously is metered into the water through line 14 in amounts sufficient to coalesce the algae, diatoms and organic material therein, generally an amount ranging from 15 to 50 parts per million. This amount is far in excess of that polymer dosage normally used in flocculation. It was unexpected that this excess amount would result in effective removal of the algae, diatoms and other organic contaminants. The air separator tank is preferably relatively shallow, such as, for example, less than seven feet in depth. The influent water should be introduced so as to minimize agitation and the effluent withdrawn at a flow velocity to again minimize agitation. Flow velocities of about 0.9 feet per second have been found to be practical. The holding time of water through the air separation tank 12 may range from 10 to 30 minutes and preferably about 15 minutes. Air may be injected in finely dispersed form into the water in the air separation tank through a grid system 16 located horizontally a few inches from the bottom of the tank having regularly spaced air nozzles therein as illustrated, or by metering air into the suction of the raw water pump at a pressure of, for example 45 p.s.i.g., sufficient to dissolve the bulk of the injected air. In the latter instance the pressure is released upon flow through a back pressure regulator (not shown) located at the infeed inlet to the air separator tank 12, causing a fine evolution of air bubbles or in a manner described in U.S. Pat. No. 3,506,125, hereby incorporated by reference. It was found that by metering 0.25 standard cubic feet per hour air for every gallon per minute of water flow provided good separation of the coalesced material. Formation of a floc following the air separator tank 12 is desirable for removal of the usual turbidity and is accomplished by conventional means in the inverted bed filter unit 24. With an inverted bed filter it is desirable to form a small-particled floc generally referred to as a "pin-point" floc. It was discovered that conventional amounts of alum (ranging from 5 to 50 p.p.m. for most natural water) would properly flocculate the water even though the water had been previously treated ahead of the air separator tank 12 with an amount of an organic, cationic polyelectrolyte in excess of the amount required for flocculation. Occasionally, adjustment of the pH of the water being flocculated may be required and is carried out by injection of acid or alkaline substances in accordance with known procedures.

The flocculating agent, alum or otherwise, and any pH adjusting chemicals are injected through line 22 into line 18. In some instances a non-ionic polyelectrolyte such as Separan NP (PWG) a polyacrylamide manufactured by the Dow Chemical Company is injected along with the alum through line 22 as a filter conditioner.

Flow of water through the inverted bed filter 24 is by gravity and according to conventional practice. Effluent water flows from the filter through line 28. Periodic backwash of the filter at needed intervals is accomplished by pumping water through line 20 up through the filter bed, the back washwater exiting the filter through line 26.

The effectiveness of the above process was proved by pilot plant results where, without the use of the treatment with the cationic organic polyelectrolyte in amounts in excess of flocculation usage and separation by means described, no combination of chemical feed would produce a filter run lasting more than 60 minutes without failure due to (1) loss of effluent quality of water and/or (2) excessive pressure drop across the filter bed. With the process described filter runs under identical conditions improved by a factor of five times with effluent water quality showing about one-third the turbidity passage otherwise.

Example I

The following runs, treatments of Snake River water taken about three-quarters of a mile upstream from the confluence of the Weiser and Snake Rivers on the Oregon shore of the Snake River, are indicative of the inadequacy of conventional treatment procedures in dealing with river water containing relatively high concentrations of algae, diatoms and other organic contaminants. The Snake River is known, particularly in the late summer, to have excessively high concentrations of diatom blooms. The most prevalent species of diatoms and algae present in the Snake River as determined by the Idaho Department of Health are the Synedra species of diatom and the Ankistroedesmus species of algae. Prior to treatment of the water, tests of the raw river water were taken and analyzed as follows:

pH _____ 8.85
Turbidity, JTU _____ 21.0
Hardness, as calcium carbonate _____ 170
Iron _____ nil Preliminary jar tests on various samples showed an optimum flocculating range of 35 to 45 p.p.m. alum.

Accordingly, Run No. 1 utilized 45 parts per million alum feed and 0.3 p.p.m. of a cationic polyelectrolyte sold under the trade name Cat–Floc. The results are given in Table I below. Both excessive pressure drop increase and rather high effluent turbidity showed the operating conditions of Run No. 1 to be unsatisfactory.

In Run No. 2 the concentration of Cat–Floc was decreased to 0.1 p.p.m. and the alum feed was retained at 45 p.p.m. A slight improvement in pressure drop but with a decided loss in quality of the water was noted.

In Run No. 3 a non-ionic polyelectrolyte, Magnifloc 990, at 0.1 p.p.m. was tried in conjunction with alum at 45 p.p.m. As indicated in Table I there was an improvement in quality of the water with, however, a loss due to the rate of pressure drop.

In Run No. 4 a lower alum feed rate of 32 p.p.m. was conducted while maintaining the concentration of Magnifloc 990 unchange at 0.1 p.p.m. Although the water quality was good and the run the best in terms of pressure drop the run was still far too short and unsatisfactory.

In Run No. 5, 2.0 p.p.m. of Cat–Floc was added ahead of the reactor vessel with 0.1 p.p.m. Magnifloc in conjunction with 15 p.p.m. alum added in the reactor vessel. The results as indicated in Table I were again deficient in both pressure drop and quality of effluent.

Example II

Utilizing the system described by the flow diagram a number of runs were made on the same river water at the same location with the results detailed in Table II. In Run No. 1 alum was added at the air separator tank inlet in a concentration of 15 p.p.m. and Cat–Floc added at the same time in a polymer dosage of 13 p.p.m. Air was sparged through the air separator tank at a rate of 0.25 s.c.f.h. (standard cubic feet per hour). The algae and diatom separation was good but there was no apparent floc formation.

In Run No. 2 the alum dosage was increased to 40 p.p.m. and no Cat–Floc used. The air sparged through the air separator tank remained at 0.25 s.c.f.h. Floc formation was excellent but algae and diatom separation poor. This indicated that a separation action due to the presence of the Cat–Floc entirely independent of flocculation of the water with alum occurred. A series of batch tests run on the same river water using concentrations of 15, 20 and 25 p.p.m. Cat–Floc alone determined that separation of the diatoms and algae was better at higher polymer concentrations and optimum at about 20 p.p.m.

In Run No. 3, the inverted bed filtration system was used, Cat–Floc only, at 20 p.p.m. was injected into the air separation tank inlet and alum at 35 p.p.m. injected at the filter inlet together with 0.1 p.p.m. of a filter conditioner, Magnifloc 990, a non-ionic polyelectrolyte. Air was injected into the air separator tank at 0.35 s.c.f.h. The characteristics of Run No. 3 were quite typical of results obtained in treating algae-free water. The start of loss of quality of the water after about 4¼ hours is normal and corrected by increase in the polyelectrolyte dosage and the rate of pressure drop increment across the filter was acceptable.

In Run No. 4 the pretreatment unit, that is the air separating unit, was completely bypassed and raw water with no air addition pumped directly to the inverted bed filter. Alum was injected to the filter inlet at 40 p.p.m. in conjunction with Magnifloc 990 at 0.1 p.p.m. The results in Table II indicated that the quality was acceptable at the start but rapidly deteriorated with the pressure drop unacceptable.

The results above illustrate that air separation in conjunction with treatment of the algae or diatom laden water with amounts of an organic, cationic polyelectrolyte in excess of that used for normal floc formation offers a low investment pretreatment process that is as effective as conventional settling basins. The process is simple and results in better quality water as compared with the settling basins and results in significantly lower costs of operation and initial capital expense.

What is claimed is:

1. A method of coalescing and separating algae, diatoms and other organic contaminants from natural surface waters containing such, comprising:
   contacting the water with an organic, cationic polyelectrolyte in a concentration beyond where a visible floc is formed,
   creating an evolution of fine gas bubbles through the treated water to float the coalesced material,
   skimming the floating coalesced material from the surface of the treated water,
   adding a flocculant to the treated water in an amount sufficient to form a visible floc, and
   running the water through an inverted bed filter having a series of filter beds of coarse to fine graded particles.

2. The method of claim 1 wherein the organic polyelectrolyte is a high molecular weight linear homopolymer of diallyldimethylammonium chloride present in an amount ranging from about 15 to 50 parts per million and the flocculant is alum present in an amount ranging from about 5 to 50 parts per million.

3. The method of claim 1 wherein the flocculant is alum.

TABLE I

| Run No. | Chemical feed | Time increment, hrs.:mins. | Pressure drop across, filter, ft. | Turbidity JTU | pH |
|---|---|---|---|---|---|
| 1 | 45 p.p.m. alum, 0.3 p.p.m. Cat-Floc | 0:00 | 6.0 | 1.0 | 7.4 |
|   | do | 1:00 | 10.00 | 1.1 | 8.2 |
| 2 | 45 p.p.m. alum, 0.1 p.p.m. Cat-Floc | 0:00 | 6.0 | 2.0 | 7.6 |
|   | do | 1:00 | 9.5 | 2.0 | 7.8 |
| 3 | 45 p.p.m. alum, 0.1 p.p.m. Magnifloc | 0:00 | 6.5 | 1.1 | 7.2 |
|   | do | 0:40 | 9.5 | 0.85 | 7.6 |
|   | do | 1:00 | 12.0 | 0.55 | 7.6 |
| 4 | 30 p.p.m. alum, 0.1 p.p.m. Magnifloc | 0:00 | 6.5 |   |   |
|   | do | 0:25 | 7.0 | 0.85 | 7.9 |
|   | do | 1:45 | 10.5 | 1.5 | 7.8 |
| 5 | 15 p.p.m. alum, 0.1 p.p.m. Magnifloc 990 | 0:00 | 6.5 | 1.3 | 8.3 |
|   | do | 0:35 | 7.5 | 1.0 |   |
|   | do | 1:30 | 12.0 | 1.1 |   |

TABLE II

| Run No. | Chemical feed | Time increment, hrs.:mins. | Pressure drop across, filter, ft. | Turbidity JTU | pH |
|---|---|---|---|---|---|
| 3 | 35 p.p.m. alum, 0.1 p.p.m. Magnifloc 990, 20 p.p.m. Cat-Floc | 0:00 | 6.5 |   |   |
|   | do | 0:10 | 6.5 | 0.30 | 7.9 |
|   | do | 1:15 | 6.5 | 0.30 |   |
|   | do | 2:06 | 7.0 | 0.16 |   |
|   | do | 3:25 | 8.5 | 0.17 |   |
|   | do | 4:25 | 9.5 | 1.5 |   |
| 4 | 40 p.p.m. alum, 0.1 p.p.m. Magnifloc 990 | 0:00 | 6.5 |   |   |
|   | do | 0:17 |   | 0.55 |   |
|   | do | 0:22 | 8.0 |   |   |
|   | do | 0:37 | 9.0 | 0.37 |   |
|   | do | 0:43 | 10.0 |   |   |
|   | do | 0:48 | 10.5 | 0.41 |   |
|   | do | 0:55 | 11.0 |   |   |
|   | do | 1:00 | 12.0 | 0.70 |   |

References Cited

UNITED STATES PATENTS

| 3,247,106 | 4/1966 | Sopoci | 210—54 X |
| 3,461,163 | 8/1969 | Boothe | 210—54 X |
| 3,637,490 | 1/1972 | Gardner et al. | 210—44 |

JOHN ADEE, Primary Examiner

I. CINTINS, Assistant Examiner

U.S. Cl. X.R.

210—53, 54, 73